(12) United States Patent
DuBose, Jr.

(10) Patent No.: US 7,447,114 B2
(45) Date of Patent: Nov. 4, 2008

(54) NON-LINEAR SEISMIC TRACE MATCHING TO WELL LOGS

(75) Inventor: John DuBose, Jr., Houston, TX (US)

(73) Assignee: Geotrace Technologies, Inc., Houston, TX (US)

( * ) Notice: Subject to any disclaimer, the term of this patent is extended or adjusted under 35 U.S.C. 154(b) by 7 days.

(21) Appl. No.: 11/216,816

(22) Filed: Aug. 31, 2005

(65) Prior Publication Data

US 2007/0064531 A1    Mar. 22, 2007

(51) Int. Cl.
*G01V 1/28* (2006.01)
*G01V 1/40* (2006.01)
*G01V 1/48* (2006.01)

(52) U.S. Cl. ............................. 367/43; 367/25; 367/44; 367/45; 367/46

(58) Field of Classification Search ............. 367/24–25, 367/38, 43–46; 702/16
See application file for complete search history.

(56) References Cited

U.S. PATENT DOCUMENTS

| 2,740,945 | A | * | 4/1956 | Howes .......................... 367/25 |
| 4,253,164 | A | | 2/1981 | Hall, Jr. |
| 4,275,398 | A | | 6/1981 | Parker et al. |
| 4,486,865 | A | * | 12/1984 | Ruehle .......................... 367/24 |
| 4,866,680 | A | | 9/1989 | Scherbatskoy |
| 5,113,379 | A | | 5/1992 | Scherbatskoy |
| 5,132,938 | A | * | 7/1992 | Walters ......................... 367/38 |
| 5,150,333 | A | | 9/1992 | Scherbatskoy |
| 5,182,730 | A | | 1/1993 | Scherbatskoy |
| 5,638,338 | A | | 6/1997 | Peterson |
| 5,671,136 | A | * | 9/1997 | Willhoit, Jr. .................. 702/18 |
| 5,774,417 | A | | 6/1998 | Corrigan et al. |
| 6,021,091 | A | | 2/2000 | Gaiser |
| 6,374,185 | B1 | | 4/2002 | Taner et al. |
| 6,385,474 | B1 | | 5/2002 | Rather et al. |
| 6,429,801 | B1 | | 8/2002 | Pergande |
| 6,507,787 | B1 | | 1/2003 | Filpo Ferreira Da Silva et al. |
| 6,631,783 | B2 | | 10/2003 | Khan |
| 6,678,207 | B2 | | 1/2004 | Duren |
| 6,678,617 | B2 | * | 1/2004 | Khan ........................... 702/16 |
| 6,684,159 | B2 | * | 1/2004 | Khan et al. .................... 702/16 |
| 6,728,567 | B2 | | 4/2004 | Rather et al. |
| 2003/0048696 | A1 | * | 3/2003 | Duren .......................... 367/24 |

OTHER PUBLICATIONS

Dubose, John A., "Seismic Trace Matching to Well Logs in a Weakly Non-Linear Earth" in Society of Exploration Geophysicists/Houston 2005 Annual Meeting, pp. 1359-1362.

* cited by examiner

*Primary Examiner*—Jack W. Keith
*Assistant Examiner*—Scott A Hughes
(74) *Attorney, Agent, or Firm*—Haynes and Boone LLP

(57) ABSTRACT

A method and apparatus for seismic trace matching to well logs.

8 Claims, 6 Drawing Sheets

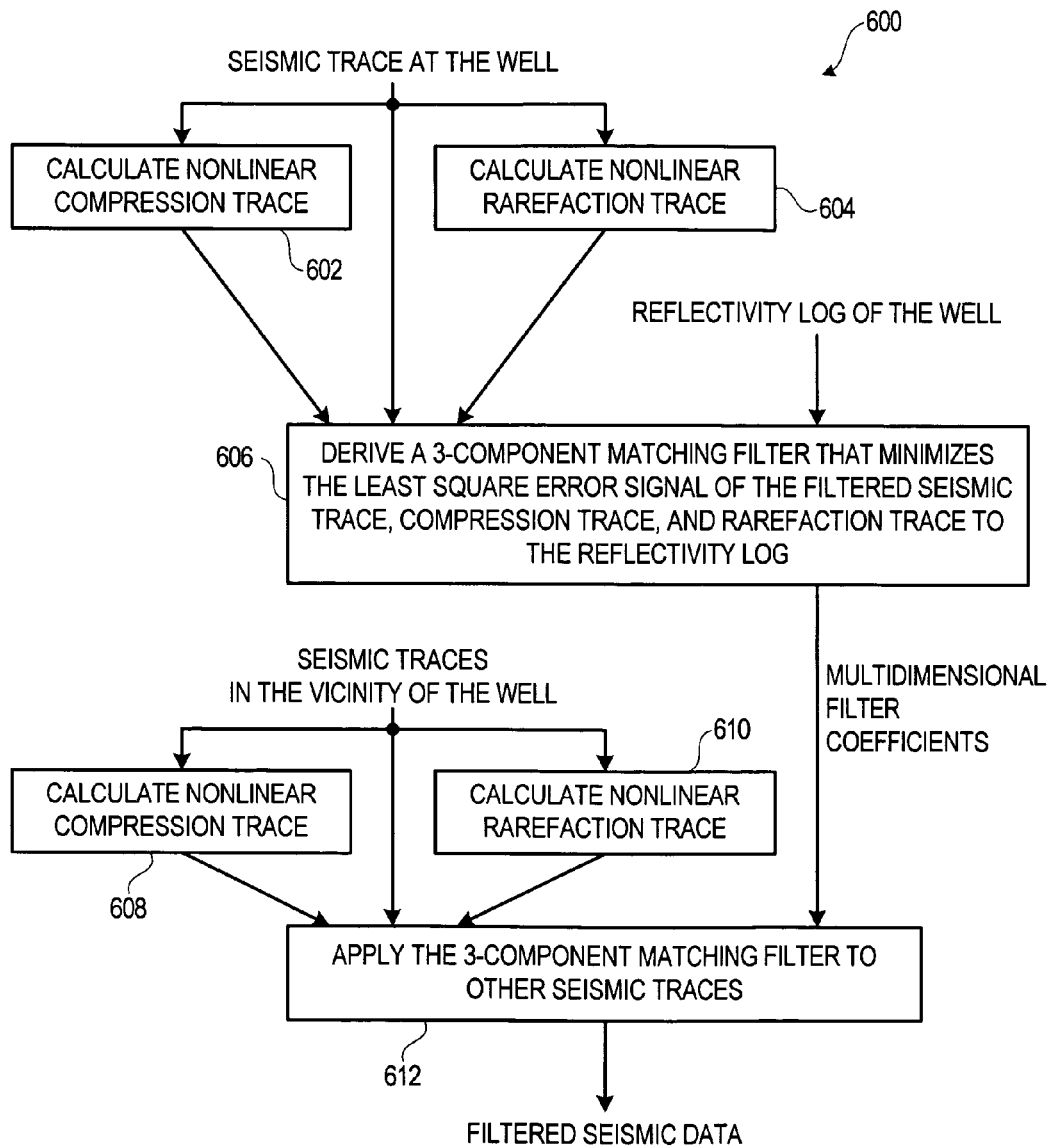

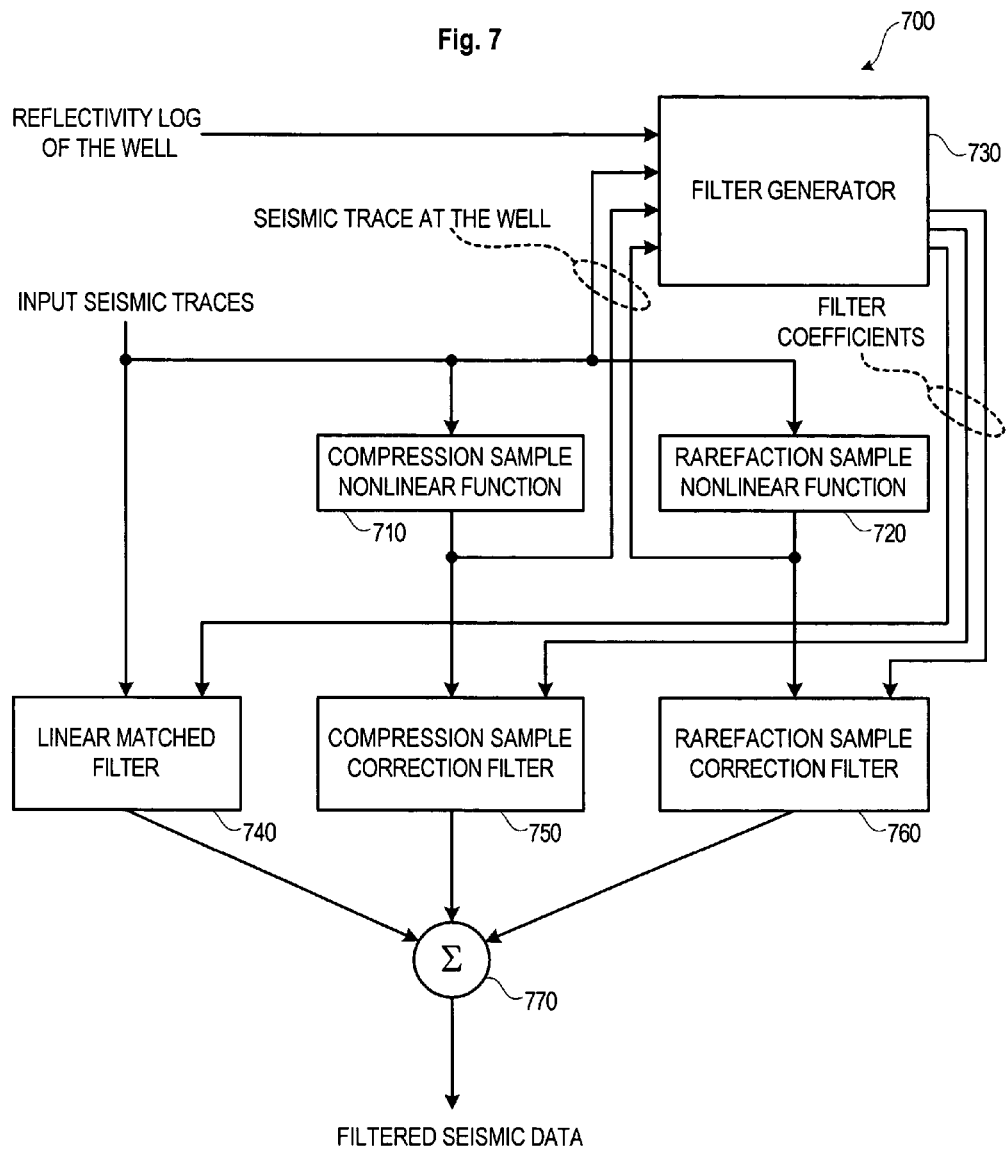

NON-LINEAR SEISMIC TRACE MATCHING TO WELL LOGS

BACKGROUND

The present disclosure relates generally to seismic processing, and more particularly to an apparatus and method for using well log data to augment seismic data.

Subsurface formations are typically mapped, e.g., for oil and gas exploration, using seismic survey techniques. When acoustic energy is launched into the earth, subsurface acoustic reflections occur at transition points in acoustic impedance, which generally correlate to boundaries between strata with different features. Although a variety of seismic energy sources and seismic detectors are common, the basic principle of seismic survey techniques involves launching one or more acoustic waves downward into the earth and listening at known locations at or near the earth's surface for reflections of these waves from subsurface features. A seismic trace is generally created for each seismic detector for each seismic energy source activation.

Generally, multiple seismic source and detector locations are selected so that a view of subsurface formations can be reconstructed in a subsurface cross-section or in a three-dimensional survey area. Various techniques exist for stacking multiple seismic traces and using multiple traces to reject multiple reflections and/or noise in a seismic trace, thereby creating processed seismic trace data that provides a more useful mapping of underground features.

Some seismic survey data error sources are difficult to correct without additional data. For instance, errors in modeled acoustic velocity tend to reduce the resolution of stacked data. The resolution of the stacked data thus can be improved when actual underground observations can be gathered, e.g., along the bore of a well at the location of a seismic trace, using sensors lowered into the well. The sensors measure, directly or indirectly as a function of depth, features such as the sound velocity in the rock around the well bore, the density of the rock, rock porosity, liquid saturation, acoustic impedance, and reflectivity. The well data is commonly referred to as a well log.

One established technique for matching seismic data to well logs is to calculate and apply simple matching filters. When following this approach, one minimizes the residual error between the filtered trace and a nearby reflectivity well log. This is done in the least squares sense by adjusting coefficients of the filter such that the filtered seismic trace at the well approximates the well log. Mathematically, this is accomplished by minimizing the function $$U = \sum_{i=1}^{N} \left( R_i - \sum_{j=-L}^{M} F_j * S_{i+j} \right)^2 \quad (1)$$

where F is the matched filter, S is the seismic trace, R is the reflectivity log, L and M define the span of the filter, and N is the number of samples along which S is to be matched to R. In one common method, the partial derivatives of this function are taken, forming a set of linear equations that are then solved to determine the filter coefficients.

Once the filter coefficients are determined, the filter is applied to other traces in the vicinity of the well. This process is further illustrated in FIG. 1, where block 100 derives the matched filter coefficients from a seismic trace at the well and a reflectivity log of the well. Block 110 then uses these matched filter coefficients to filter other seismic traces in the vicinity of the well, producing corresponding filtered seismic data for each input seismic trace.

To further exemplify the process, FIG. 2 shows a data set 200 comprising a portion of each of a plurality of seismic traces, where the x-axis represents distance along a survey line, the y-axis represents sample time, and the z-axis (shown as left-right movement along each trace and corresponding shading) represents variations in reflectivity. This data is taken from an actual land survey, with temporal sample spacing of 1 ms.

A synthetic seismogram 210 is shown overlaid on data set 200. The synthetic seismogram 210 was derived from a well log comprising density and sound velocity as a function of depth. The acoustic impedance was calculated by multiplying the density and sound velocity at each sample point, and then synthetic reflectivity was calculated from the derivative of the acoustic impedance. As can be observed, the synthetic seismogram 210 contains much higher frequency content than the seismic traces, and thus reveals details in the vicinity of the well that are missing from the corresponding seismic trace 220, taken at the location of the well.

In a first example, a 54 ms-long matched filter was obtained by performing a least-squares fit of synthetic (i.e., well log) seismogram 210 to seismic trace 220 over the samples in the range between 2.5 and 3.05 seconds. The resulting matched filter was then run over the other seismic traces in data set 200 to create filtered reflectivity data. A recursive inversion was then performed to produce a relative impedance plot 300, a portion of which is illustrated in FIG. 3. The corresponding section of a well log acoustic impedance plot 310 is shown overlaid on plot 300, and more specifically overlying a filtered trace 320 at the location of the well. The filtered plot does not contain the high frequencies necessary to represent the detail in high-frequency events evident in the well log, e.g., those at about 2.64 and 2.92 seconds.

In a second example, the linear matched filter example was rerun at three times the filter length (162 ms) of the original example, resulting in the relative impedance plot 400 illustrated in FIG. 4. The recursive inversion of this data (e.g., filtered trace 420) matches well log acoustic impedance plot 310 better than plot 300 did, particularly at low frequencies, but does not appear to add any higher frequency content to the plot.

SUMMARY OF THE INVENTION

It has now been recognized that a different approach can improve upon the performance of a linear matched filter in well-log matching in many circumstances. The present disclosure describes a non-linear filtering method and apparatus that augments a linear matching filter with nonlinear coefficients that treat the stress and strain components represented in the data differently.

In one aspect of the disclosure, a method of filtering seismic data is described. An input seismic trace comprising negative and positive samples is selected to be matched to a reference trace, e.g., well log data. A plurality of the negative samples are used to calculate a nonlinear rarefaction trace, and a plurality of the positive samples are used to calculate a nonlinear compression trace. A multi-component matching filter is derived to fit a plurality of samples from the input seismic trace, the nonlinear rarefaction trace, and the nonlinear compression trace to the reference trace. It is believed that because different filter coefficients are available to account for different nonlinearities present in compression and rarefaction samples, and to provide additional frequency content, the multi-component matching filter can provide a better match to the reference trace.

The above-described method is amenable to implementation using one or more programmed computers. As such, another aspect of the disclosure pertains to an apparatus comprising a computer-readable medium containing computer instructions for performing the above-described method.

In yet another aspect of the disclosure a system for filtering seismic data is described. The system can comprise one or more computers executing the computer instructions identified above, special-purpose hardware, or a combination of the two. The system comprises a compression sample correction filter to provide a nonlinear correction for compression samples in an input seismic trace, a rarefaction sample correction filter to provide a nonlinear correction for rarefaction samples in the input seismic trace, and a linear matched filter to provide a filtered version of the input seismic trace. An adder combines the output of the three filters to produce a filtered seismic trace. A filter generator derives coefficients for the compression sample correction filter, rarefaction sample correction filter, and linear matched filter from a reference trace and samples selected from at least one seismic trace to be matched to the reference trace.

BRIEF DESCRIPTION OF THE DRAWINGS

The present disclosure may be best understood by reference to the attached figures and corresponding text, wherein:

FIG. 6 depicts a process for filtering seismic data according to an embodiment of the present invention; and FIG. 7 illustrates a system for filtering seismic data according to an embodiment of the present invention.

DETAILED DESCRIPTION

Figure 1:
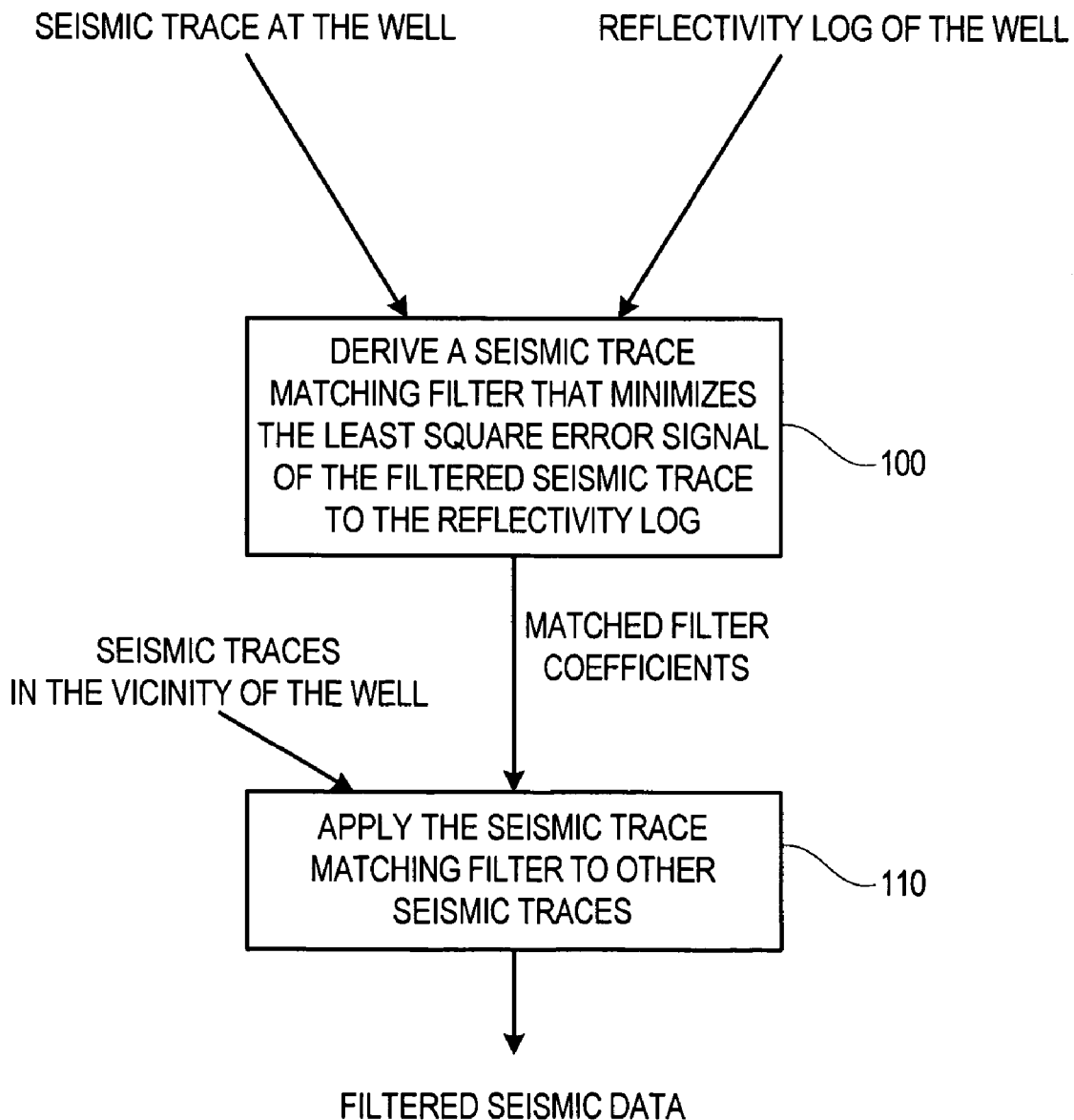
FIG. 1 contains a process diagram illustrating a prior art method for filtering seismic data.
Figure 2:
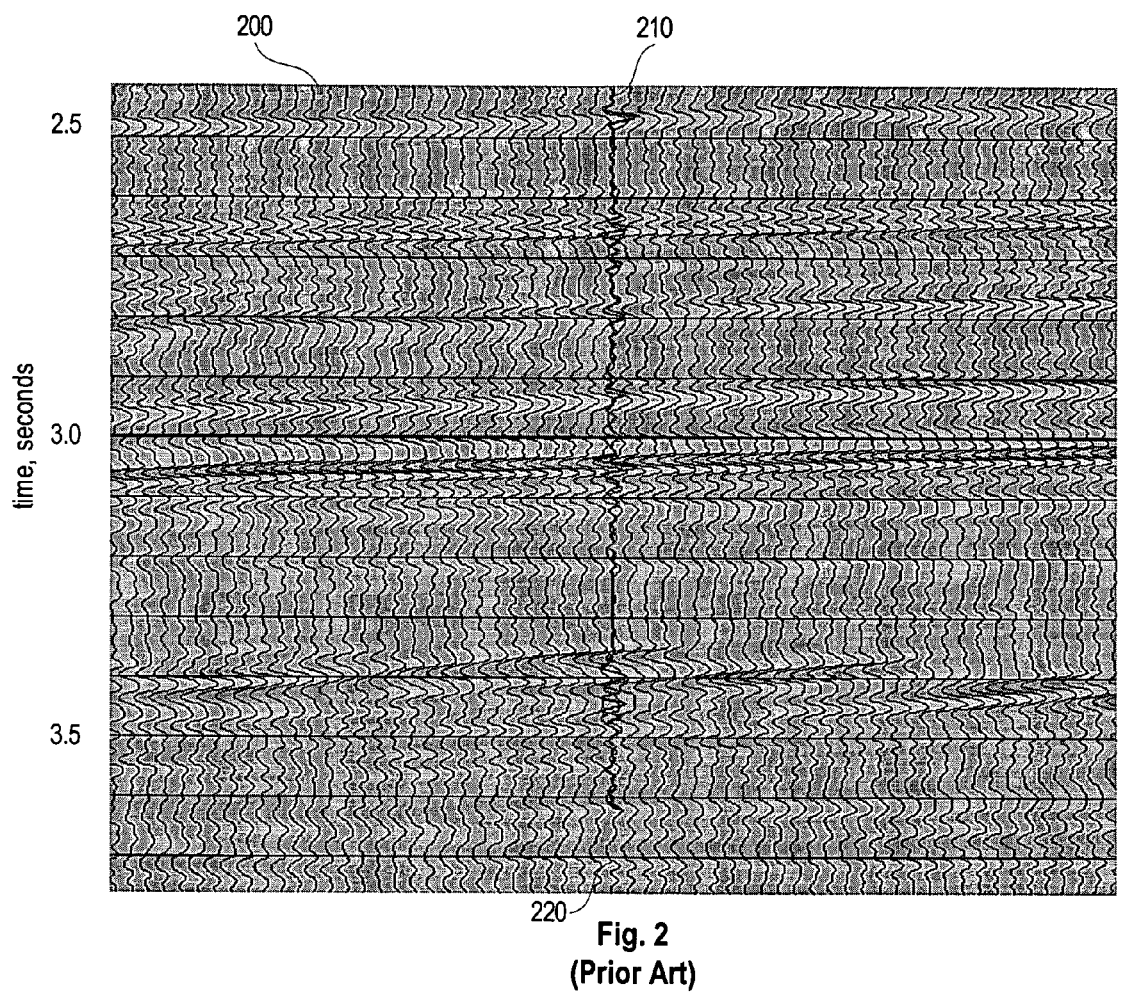
FIG. 2 illustrates sample seismic and well log data used in the examples described herein.

A key physical assumption implicitly made in well log matched filtering is that stress is strictly proportional to strain as seismic waves propagate through the earth. At least for high stress cases, however, a force applied to the earth does not yield an exactly proportional strain. It is hypothesized herein that a weak nonlinear effect exists even at the small deformations that occur when weaker pulses arrive deep in the earth. If such an effect is present, the resulting nonlinearity creates harmonic distortion. It has now been recognized that well log matched filtering with a method that is capable of at least partially compensating for differences in stress/strain response and resulting harmonic distortion, if such exist, is preferable.

Another difficulty with well log matched filtering arises from the fact that reflectivity logs generally contain valid information over a larger range of frequencies than those present in seismic data. To avoid spectral division by very small numbers, one must often filter the well data or force extra stability into the diagonal elements of the equation matrix during linear matched filtering. Only frequencies that are present in both the log and seismic data can be accurately matched using this prior art method.

As an introduction to the embodiments, FIG. 6 shows a general process 600 for applying a nonlinear matching filter according to an embodiment of the present invention. A seismic trace at the well location is supplied to blocks 602 and 604, which respectively calculate (as will be explained in detail below) a nonlinear compression trace and a nonlinear rarefaction trace for a section of interest of the seismic trace. The nonlinear compression trace, nonlinear rarefaction trace, and seismic trace are supplied to block 606, along with a reflectivity log of the well. Block 606 derives (as will be explained in detail below) a three-component matching filter that minimizes the least square error signal of the filtered seismic trace, compression trace, and rarefaction trace to the reflectivity log.

Other seismic traces in the vicinity of the well are supplied to blocks 608 and 610, which calculate corresponding compression and rarefaction traces, respectively, using the same functions used for the seismic trace at the well. The other seismic traces, compression traces, and rarefaction traces are supplied to block 612, which applies the three-component matching filter derived in block 606 to produce filtered seismic data.

In one exemplary embodiment, a nonlinear compression trace Q (blocks 602 and 608) is calculated using the model $$Q_i = \begin{cases} S_i^{1+r} - S_i & S_i > 0 \\ 0 & S_i \leq 0 \end{cases} \quad (2)$$

and a nonlinear rarefaction trace (blocks 604 and 610) is calculated using the model $$Z_i = \begin{cases} -S_i(-S_i)^{1+r} & S_i < 0 \\ 0 & S_i \geq 0 \end{cases} \quad (3)$$

where S is the seismic trace at the well (blocks 602 and 604) or a seismic trace in the vicinity of the well (blocks 608 and 610). Each of these forms approximate a correction for an unknown nonlinearity, and contain induced spectral components beyond the original seismic band. Separate functions are provided for the compression phase and rarefaction phase, and indeed the specific nonlinear function chosen need not be the same for each (here both follow the functional form $f_x = |x|^{1+r} - |x|$ for their respective samples of interest). For the example results shown in FIG. 5, equations 2 and 3 were followed, with r=0.02. It is believed that the final result is fairly insensitive to the value of r, because the least squares fitting process forces a near fit to the model, with values of r up to 1 appearing preferable.

The selected samples from S, Q, and Z for the seismic trace at the well and the reflectivity log R of the well are used to solve the function;

$$V = \sum_{i=1}^{N} \left( R_i - \sum_{j=-L}^{M} F1_j * S_{i+j} - \sum_{j=-L}^{M} F2_j * Q_{i+j} - \sum_{j=-L}^{M} F3_j * Z_{i+j} \right)^2 \quad (4)$$

in a least-squares sense, by differentiation and solution of the resulting matrix, e.g., using a Gauss-Seidel algorithm. As compared to a matched filter of the same temporal extent, this matrix is three times the size, but no other difficulties have been observed in its solution. Note that F1 is the linear component of the multi-component filter, F2 is the compression filter, and F3 is the rarefaction filter.

Once the coefficients of F1, F2, and F3 are determined, they are applied to seismic traces near the well to produce filtered traces T. Each filtered trace sample $T_i$ is calculated as $$T_i = \sum_{j=-L}^{M} F1_j * S_{i+j} - \sum_{j=-L}^{M} F2_j * Q_{i+j} - \sum_{j=-L}^{M} F3_j * Z_{i+j} \qquad (5)$$

where $Q_i$ and $Z_i$ are calculated from $T_i$ in the same manner used during the derivation of the filter.

Figure 3:
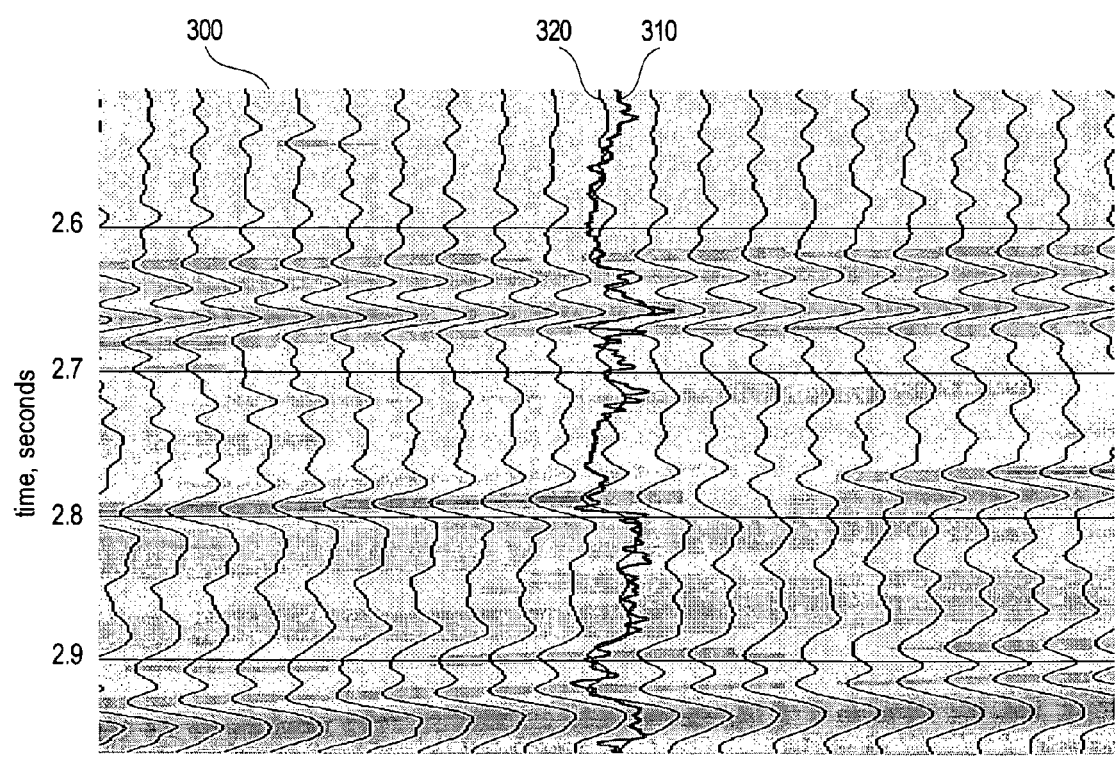
FIGS. 3 and 4 show relative acoustic impedance data for a portion of FIG. 2 after processing with two different length linear matched filters.
Figure 4:
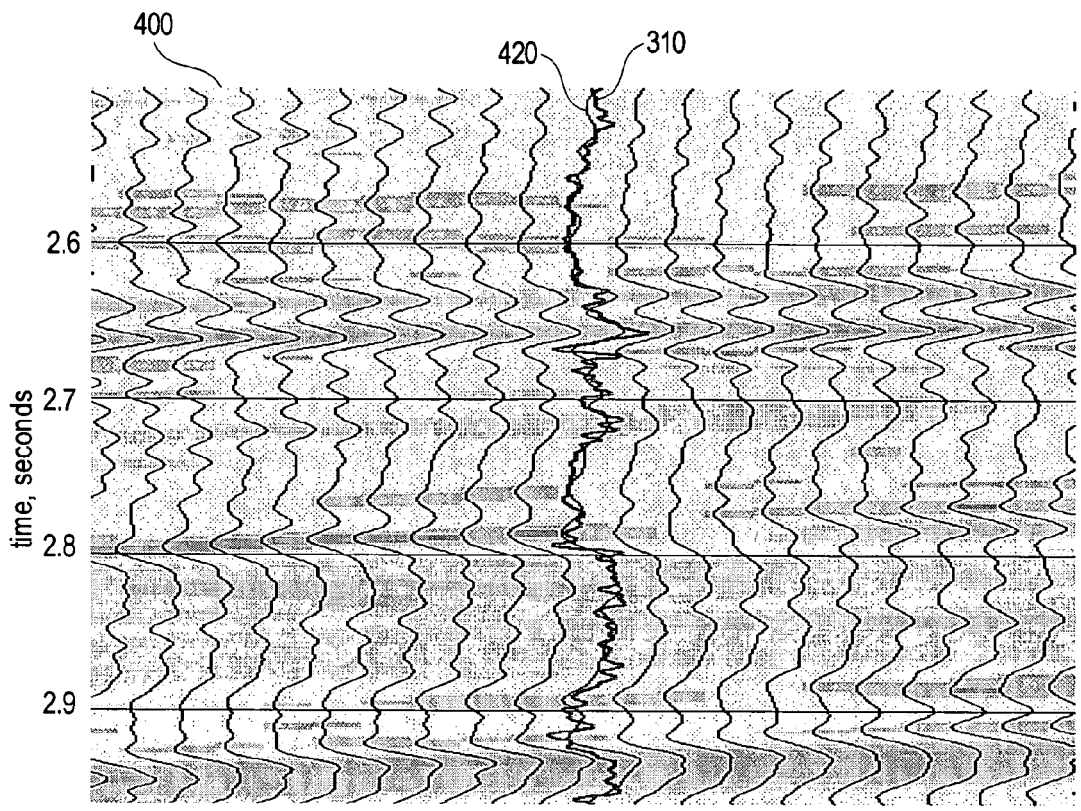
Figure 5:
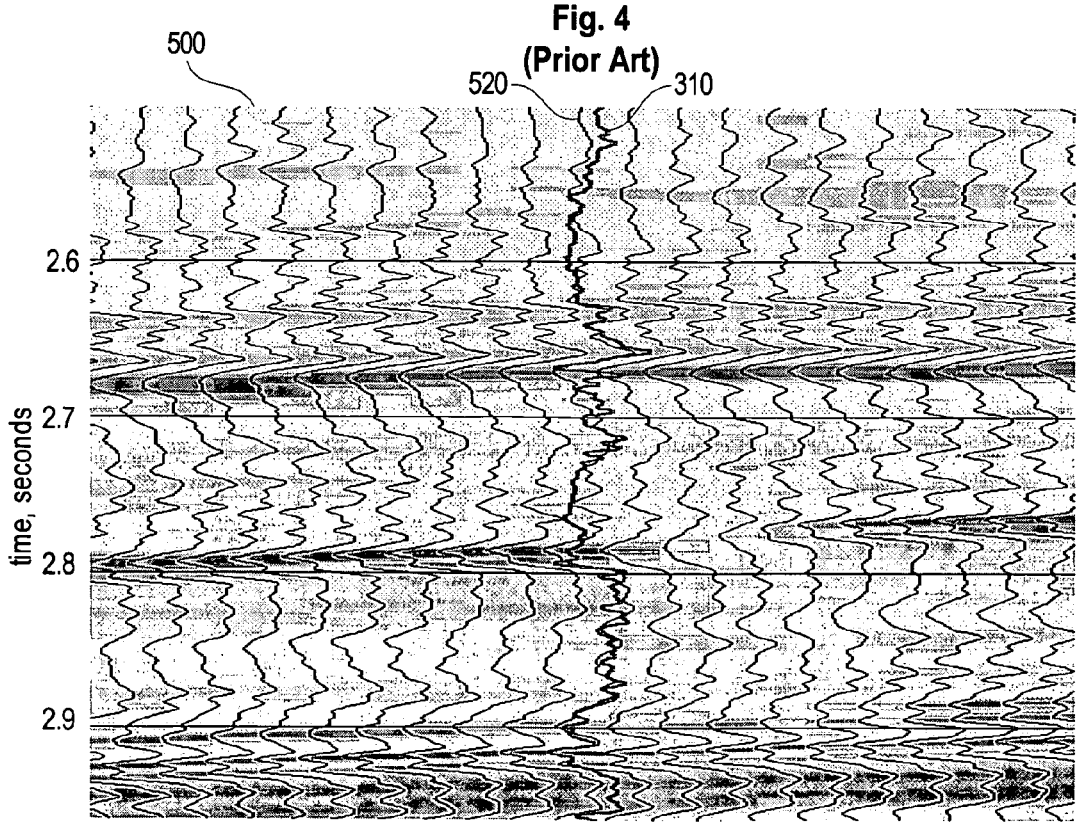
FIG. 5 shows relative acoustic impedance data for the same portion of FIG. 2, after processing with a nonlinear matched filter according to an embodiment of the present invention.

FIG. 5 illustrates the results obtained with the exemplary embodiment described above with r=0.02, for the same input data and 54 ms-long filter length used in the matched filter example of FIG. 3. Much higher frequencies are present in plot 500, with filtered seismic trace 520 and the surrounding traces significantly better represent the high frequency events at about 2.64 and 2.92 seconds than the matched filtering examples. In experiments, the non-linear matching process gives a much broader band output than the linear matched filter, and provides a much more accurate match with the well log.

It is not yet known how far away from the well one can expect the results to be valid, as the higher frequencies apparent in the filtered traces are incorporated from the well log. As one extrapolates away from the well, the broadband results appear plausible.

As digitally sampled records of seismic traces and well logs are virtually ubiquitous, the described methods are suited for implementation on a digital computer or a group of such computers. It will be apparent to those of ordinary skill in the art, familiar with digital filter implementation and minimization problem solutions, that the equations presented above are readily implemented in software. Such software can be stored, for example, on a networked server, a portable media such as an optical disk or tape, on mass storage attached to a computer such as a magnetic disk or flash memory, or in RAM. The functions necessary to implement the embodiments can be assigned to a single processor, or divided among a group of processors in a single or on multiple platforms.

The present disclosure also encompasses a system for filtering seismic data, whether the system encompasses a programmable computer configured as described above, special-purpose hardware, or a combination of the two. FIG. 7 illustrates the general architectural arrangement of such a system 700. Input seismic traces are supplied to a compression sample nonlinear function 710 and rarefaction sample nonlinear function 720 that, e.g., implement equations 2 and 3. For the input seismic trace at the well, that trace, along with the output of the compression and rarefaction sample nonlinear functions, is supplied to a filter generator 730. The filter generator 730 uses these seismic trace inputs and a reflectivity log of the well to solve, e.g., equation 4. After solving equation 4, filter generator 730 outputs filter coefficients to a linear matched filter 740, compression sample correction filter 750, and rarefaction sample correction filter 760.

Once the filter generator 730 has initialized filters 740, 750, and 760, additional seismic traces can be run through functions 710 and 720, and filters 740, 750, and 760. An adder 770 combines the output of filters 740, 750, and 760 to produce filtered seismic data.

The term "seismic trace" is intended to be used herein in a non-limiting fashion. For instance, seismic traces as used herein can be obtained from raw on-shore or marine survey data, as well as survey data that has been preprocessed, gathered, and/or filtered to remove noise and survey artifacts. More than one seismic trace can also be used to derive the filter coefficients. Although well logs are a primary example of the reference trace used in the embodiments, other potential reference trace sources, such as core data, are possible.

The particular equations and numerical solution methods described herein are each merely one possible implementation. Other nonlinear functions, such as an arctangent function, can be substituted in an embodiment for the 1+r exemplary embodiment. Likewise, other minimization functions and methods can be selected as appropriate. Many other similar design choices will be apparent to those of ordinary skill in the art after reading this disclosure, and are intended to be covered by the appended claims.

A method of filtering seismic data has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; and deriving a multi-component matching filter to fit a plurality of samples from the input seismic trace, nonlinear compression trace, and nonlinear rarefaction trace to a reference trace. In an exemplary embodiment, the method further includes filtering a second seismic trace, comprising negative and positive samples, using the multi-component matching filter. In an exemplary embodiment, filtering a second seismic trace includes calculating, from the second seismic trace, a second nonlinear compression trace using a plurality of the positive samples from the second seismic trace; calculating a second nonlinear rarefaction trace using a plurality of the negative samples from the second seismic trace; and applying the multi-component matching filter to the second seismic trace, second nonlinear compression trace, and second nonlinear rarefaction trace. In an exemplary embodiment, the reference trace is a well log trace, and the input seismic trace represents data gathered for subsurface formations in the vicinity of the well bore from which the well log trace was gathered. In an exemplary embodiment, the well log comprises measured or calculated data as a function of well depth, comprising at least one of sound velocity, density, porosity, liquid saturation, acoustic impedance, and reflectivity. In an exemplary embodiment, calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function. In an exemplary embodiment, calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample. In an exemplary embodiment, $f_x=|x|^{1+r}-|x|$. In an exemplary embodiment, $0<r\leq1$. In an exemplary embodiment, deriving a multi-component matching filter includes minimizing the function $$V = \sum_{i=1}^{N} \left( R_i - \sum_{j=-L}^{M} F1_j * S_{i+j} - \sum_{j=-L}^{M} F2_j * Q_{i+j} - \sum_{j=-L}^{M} F3_j * Z_{i+j} \right)^2,$$

wherein the multi-component matching filter comprises an adjusted normal trace filter F1, a compression filter F2, and a rarefaction filter F3.

An apparatus including a computer-readable medium containing computer instructions that, when executed by at least one processor cause the at least one processor to perform a method has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; and deriving a multi-component matching filter to fit a plurality of samples from the input seismic trace, nonlinear compression trace, and nonlinear rarefaction trace to a reference trace. In an exemplary embodiment, the method further includes filtering a second seismic trace, comprising negative and positive samples, using the multi-component matching filter. In an exemplary embodiment, filtering a second seismic trace includes calculating, from the second seismic trace, a second nonlinear compression trace using a plurality of the positive samples from the second seismic trace; calculating a second nonlinear rarefaction trace using a plurality of the negative samples from the second seismic trace; and applying the multi-component matching filter to the second seismic trace, second nonlinear compression trace, and second nonlinear rarefaction trace. In an exemplary embodiment, the reference trace is a well log trace, and the input seismic trace represents data gathered for subsurface formations in the vicinity of the well bore from which the well log trace was gathered. In an exemplary embodiment, the well log comprises measured or calculated data as a function of well depth, comprising at least one of sound velocity, density, porosity, liquid saturation, acoustic impedance, and reflectivity. In an exemplary embodiment, calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function. In an exemplary embodiment, calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample. In an exemplary embodiment, $f_x=|x|^{1+r}-|x|$. In an exemplary embodiment, $0<r\leq1$. In an exemplary embodiment, deriving a multi-component matching filter includes minimizing the function $$V = \sum_{i=1}^{N}\left(R_i - \sum_{j=-L}^{M} F1_j * S_{i+j} - \sum_{j=-L}^{M} F2_j * Q_{i+j} - \sum_{j=-L}^{M} F3_j * Z_{i+j}\right)^2,$$

wherein the multi-component matching filter comprises an adjusted normal trace filter F1, a compression filter F2, and a rarefaction filter F3.

A system for filtering seismic data has been described that includes a compression sample correction filter to provide a nonlinear correction for compression samples in an input seismic trace; a rarefaction sample correction filter to provide a nonlinear correction for rarefaction samples in the input seismic trace; a linear matched filter to provide a filtered version of the input seismic trace; an adder to combine the output of the compression sample correction filter, rarefaction sample correction filter, and linear matched filter to produce a filtered seismic trace; and a filter generator to derive the compression sample correction filter, rarefaction sample correction filter, and linear matched filter from a reference trace and a plurality of samples from at least one seismic trace to be matched to the reference trace. In an exemplary embodiment, the compression sample correction filter comprises a compression sample nonlinear function and a linear compression sample correction filter that operates on the output of the compression sample nonlinear function, and wherein the rarefaction sample correction filter comprises a rarefaction sample nonlinear function and a linear rarefaction sample correction filter that operates on the output of the rarefaction sample nonlinear function. In an exemplary embodiment, the rarefaction sample nonlinear function and compression sample nonlinear function also provide output to the filter generator for the at least one seismic trace to be matched to the reference trace.

A method of filtering seismic data has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; deriving a multi-component matching filter to fit a plurality of samples from the input seismic trace, nonlinear compression trace, and nonlinear rarefaction trace to a well log trace, wherein the input seismic trace represents data gathered for subsurface formations in the vicinity of the well bore from which the well log trace was gathered; for each of a set of second seismic traces nearby the input seismic trace, calculating, from the second seismic trace, a second nonlinear compression trace using a plurality of the positive samples from the second seismic trace, calculating a second nonlinear rarefaction trace using a plurality of the negative samples from the second seismic trace, and applying the multi-component matching filter to the second seismic trace, second nonlinear compression trace, and second nonlinear rarefaction trace. In an exemplary embodiment, calculating a nonlinear compression trace using a plurality of the positive samples from a seismic trace comprises selecting the positive samples $S_i>0$ from the seismic trace, and calculating a nonlinear compression sample $Q_i=f(S_i)$ for each positive sample, wherein $f(x)$ is a nonlinear function, and wherein calculating a nonlinear rarefaction trace using a plurality of the negative samples from a seismic trace comprises selecting the negative samples $S_i<0$ from the seismic trace, and calculating a nonlinear rarefaction sample $Z(i)=f(S_i)$ for each negative sample. In an exemplary embodiment, $f_x=|x|^{1+r}-|x|$, and wherein $0<r\leq1$.

A system for filtering seismic data has been described that includes means for augmenting a seismic trace comprising positive and negative samples with additional samples calculated from the seismic trace, the additional calculated samples containing induced spectral components not present in the seismic trace; means for deriving filter coefficients for a filter matching a selected augmented seismic trace to a reference trace; and means for filtering other selected augmented seismic traces using the filter coefficients. In an exemplary embodiment, the means for augmenting a seismic trace includes: a compression sample function to form additional samples based on a nonlinear transformation of positive samples from the seismic trace; and a rarefaction sample function to form additional samples based on a nonlinear transformation of negative samples from the seismic trace. In an exemplary embodiment, the means for filtering other selected augmented seismic traces comprises a filter that convolves the filter coefficients with the augmented seismic traces for a selected trace to produce an output seismic trace.

A method of filtering seismic data has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; deriving a multi-component matching filter to fit a plurality of samples from the input seismic trace, nonlinear compression trace, and nonlinear rarefaction trace to a reference trace; and filtering a second seismic trace, comprising negative and positive samples, using the multi-component matching filter; wherein filtering a second seismic trace includes: calculating, from the second seismic trace, a second nonlinear compression trace using a plurality of the positive samples from the second seismic trace; calculating a second nonlinear rarefaction trace using a plurality of the negative samples from the second seismic trace; and applying the multi-component matching filter to the second seismic trace, second nonlinear compression trace, and second nonlinear rarefaction trace; wherein the reference trace is a well log trace, and the input seismic trace represents data gathered for subsurface formations in the vicinity of the well bore from which the well log trace was gathered; wherein the well log comprises measured or calculated data as a function of well depth, comprising at least one of sound velocity, density, porosity, liquid saturation, acoustic impedance, and reflectivity; wherein calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function; wherein calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample; wherein $f_x=|x|^{1+r}-|x|$; wherein $0<r\leq 1$; and wherein deriving a multi-component matching filter comprises minimizing the function $$V = \sum_{i=1}^{N}\left(R_i - \sum_{j=-L}^{M} F1_j * S_{i+j} - \sum_{j=-L}^{M} F2_j * Q_{i+j} - \sum_{j=-L}^{M} F3_j * Z_{i+j}\right)^2,$$

wherein the multi-component matching filter comprises an adjusted normal trace filter F1, a compression filter F2, and a rarefaction filter F3.

An apparatus including a computer-readable medium containing computer instructions that, when executed by at least one processor cause the at least one processor to perform a method has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; deriving a multi-component matching filter to fit a plurality of samples from the input seismic trace, nonlinear compression trace, and nonlinear rarefaction trace to a reference trace; and filtering a second seismic trace, comprising negative and positive samples, using the multi-component matching filter; wherein filtering a second seismic trace comprises: calculating, from the second seismic trace, a second nonlinear compression trace using a plurality of the positive samples from the second seismic trace; calculating a second nonlinear rarefaction trace using a plurality of the negative samples from the second seismic trace; and applying the multi-component matching filter to the second seismic trace, second nonlinear compression trace, and second nonlinear rarefaction trace; wherein the reference trace is a well log trace, and the input seismic trace represents data gathered for subsurface formations in the vicinity of the well bore from which the well log trace was gathered; wherein the well log comprises measured or calculated data as a function of well depth, comprising at least one of sound velocity, density, porosity, liquid saturation, acoustic impedance, and reflectivity; wherein calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function; wherein calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample; wherein $f_x=|x|^{1+r}-|x|$; wherein $0<r\leq 1$; and wherein deriving a multi-component matching filter comprises minimizing the function $$V = \sum_{i=1}^{N}\left(R_i - \sum_{j=-L}^{M} F1_j * S_{i+j} - \sum_{j=-L}^{M} F2_j * Q_{i+j} - \sum_{j=-L}^{M} F3_j * Z_{i+j}\right)^2,$$

wherein the multi-component matching filter comprises an adjusted normal trace filter F1, a compression filter F2, and a rarefaction filter F3.

A system for filtering seismic data has been described that includes a compression sample correction filter to provide a nonlinear correction for compression samples in an input seismic trace; a rarefaction sample correction filter to provide a nonlinear correction for rarefaction samples in the input seismic trace; a linear matched filter to provide a filtered version of the input seismic trace; an adder to combine the output of the compression sample correction filter, rarefaction sample correction filter, and linear matched filter to produce a filtered seismic trace; and a filter generator to derive the compression sample correction filter, rarefaction sample correction filter, and linear matched filter from a reference trace and a plurality of samples from at least one seismic trace to be matched to the reference trace; wherein the compression sample correction filter comprises a compression sample nonlinear function and a linear compression sample correction filter that operates on the output of the compression sample nonlinear function, and wherein the rarefaction sample correction filter comprises a rarefaction sample nonlinear function and a linear rarefaction sample correction filter that operates on the output of the rarefaction sample nonlinear function; and wherein the rarefaction sample nonlinear function and compression sample nonlinear function also provide output to the filter generator for the at least one seismic trace to be matched to the reference trace.

A method of filtering seismic data has been described that includes calculating, from an input seismic trace comprising negative and positive samples, a nonlinear compression trace using a plurality of the positive samples from the input seismic trace; calculating a nonlinear rarefaction trace using a plurality of the negative samples from the input seismic trace; deriving a multi-component matching filter to fit a plurality of samples from the input seismic trace, nonlinear compression trace, and nonlinear rarefaction trace to a well log trace, wherein the input seismic trace represents data gathered for subsurface formations in the vicinity of the well bore from which the well log trace was gathered; and for each of a set of second seismic traces nearby the input seismic trace, calculating, from the second seismic trace, a second nonlinear compression trace using a plurality of the positive samples from the second seismic trace, calculating a second nonlinear rarefaction trace using a plurality of the negative samples from the second seismic trace, and applying the multi-component matching filter to the second seismic trace, second nonlinear compression trace, and second nonlinear rarefaction trace; wherein calculating a nonlinear compression trace using a plurality of the positive samples from a seismic trace comprises selecting the positive samples $S_i>0$ from the seismic trace, and calculating a nonlinear compression sample $Q_i=f(S_i)$ for each positive sample, wherein $f(x)$ is a nonlinear function, and wherein calculating a nonlinear rarefaction trace using a plurality of the negative samples from a seismic trace comprises selecting the negative samples $S_i<0$ from the seismic trace, and calculating a nonlinear rarefaction sample $Z(i)=f(S_i)$ for each negative sample; and wherein $f_x=|x|^{1+r}-|x|$, and wherein $0<r\leq 1$.

A system for filtering seismic data has been described that includes means for augmenting a seismic trace comprising positive and negative samples with additional samples calculated from the seismic trace, the additional calculated samples containing induced spectral components not present in the seismic trace; means for deriving filter coefficients for a filter matching a selected augmented seismic trace to a reference trace; and means for filtering other selected augmented seismic traces using the filter coefficients; wherein the means for augmenting a seismic trace comprises: a compression sample function means to form additional samples based on a nonlinear transformation of positive samples from the seismic trace; and a rarefaction sample function means to form additional samples based on a nonlinear transformation of negative samples from the seismic trace; and wherein the means for filtering other selected augmented seismic traces comprises a filter means that convolves the filter coefficients with the augmented seismic traces for a selected trace to produce an output seismic trace.

Although illustrative embodiments have been shown and described, a wide range of modification, change and substitution is contemplated in the foregoing disclosure and in some instances, some features of the embodiments may be employed without a corresponding use of other features. The use of plural and singular descriptors is not intended to generally indicate that a plural or singular item is the only possibility. Accordingly, it is appropriate that the appended claims be construed broadly and in a manner consistent with the scope of the embodiments disclosed herein.

What is claimed is:

1. A method of filtering seismic data, the method comprising:
   calculating, from an input seismic trace comprising negative and positive samples, a nonlinear compression trace using a plurality of the positive samples from the input seismic trace;
   calculating a nonlinear rarefaction trace using a plurality of the negative samples from the input seismic trace; and
   deriving a multi-component matching filter to fit a plurality of samples from the input seismic trace, nonlinear compression trace, and nonlinear rarefaction trace to a reference trace,
   wherein calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function, and
   wherein calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample, and
   wherein deriving a multi-component matching filter comprises minimizing the function $$V = \sum_{i=1}^{N}\left(R_i - \sum_{j=-L}^{M} F1_j*S_{i+j} - \sum_{j=-L}^{M} F2_j*Q_{i+j} - \sum_{j=-L}^{M} F3_j*Z_{i+j}\right)^2,$$

wherein the multi-component matching filter comprises an adjusted normal trace filter F1, a compression filter F2, and a rarefaction filter F3.

2. The method of claim 1, further comprising filtering a second seismic trace, comprising negative and positive samples, using the multi-component matching filter.

3. The method of claim 2, wherein filtering a second seismic trace comprises:
   calculating, from the second seismic trace, a second nonlinear compression trace using a plurality of the positive samples from the second seismic trace;
   calculating a second nonlinear rarefaction trace using a plurality of the negative samples from the second seismic trace; and
   applying the multi-component matching filter to the second seismic trace, second nonlinear compression trace, and second nonlinear rarefaction trace.

4. The method of claim 1, wherein the reference trace is a well log trace, and the input seismic trace represents data gathered for subsurface formations in the vicinity of the well bore from which the well log trace was gathered.

5. The method of claim 4, wherein the well log comprises measured or calculated data as a function of well depth, comprising at least one of sound velocity, density, porosity, liquid saturation, acoustic impedance, and reflectivity.

6. The method of claim 1, wherein $f_x=|x|^{1+r}-|x|$.

7. The method of claim 6, wherein $0<r\leq 1$.

8. A method of filtering seismic data, the method comprising:
   calculating, from an input seismic trace comprising negative and positive samples, a nonlinear compression trace using a plurality of the positive samples from the input seismic trace;
   calculating a nonlinear rarefaction trace using a plurality of the negative samples from the input seismic trace;
   deriving a multi-component matching filter to fit a plurality of samples from the input seismic trace, nonlinear compression trace, and nonlinear rarefaction trace to a reference trace; and
   filtering a second seismic trace, comprising negative and positive samples, using the multi-component matching filter;
   wherein filtering a second seismic trace comprises:
   calculating, from the second seismic trace, a second nonlinear compression trace using a plurality of the positive samples from the second seismic trace;

calculating a second nonlinear rarefaction trace using a plurality of the negative samples from the second seismic trace; and applying the multi-component matching filter to the second seismic trace, second nonlinear compression trace, and second nonlinear rarefaction trace;

wherein the reference trace is a well log trace, and the input seismic trace represents data gathered for subsurface formations in the vicinity of the well bore from which the well log trace was gathered;

wherein the well log comprises measured or calculated data as a function of well depth, comprising at least one of sound velocity, density, porosity, liquid saturation, acoustic impedance, and reflectivity;

wherein calculating a nonlinear compression trace using a plurality of the positive samples from the input seismic trace comprises selecting the positive samples $S_i>0$ from the input seismic trace, and calculating a nonlinear compression sample $Q_i=f(S_i)$ for each positive sample, wherein $f(x)$ is a nonlinear function;

wherein calculating a nonlinear rarefaction trace using a plurality of the negative samples from the input seismic trace comprises selecting the negative samples $S_i<0$ from the input seismic trace, and calculating a nonlinear rarefaction sample $Z(i)=f(S_i)$ for each negative sample;

wherein $f_x=|x|^{1+r}-|x|$;

wherein $0<r\leqq 1$; and wherein deriving a multi-component matching filter comprises minimizing the function $$V = \sum_{i=1}^{N}\left(R_i - \sum_{j=-L}^{M} F1_j * S_{i+j} - \sum_{j=-L}^{M} F2_j * Q_{i+j} - \sum_{j=-L}^{M} F3_j * Z_{i+j}\right)^2,$$

wherein the multi-component matching filter comprises an adjusted normal trace filter F1, a compression filter F2, and a rarefaction filter F3.

* * * * *